United States Patent [19]

Sweeting

[11] 4,001,806

[45] Jan. 4, 1977

[54] DEFLECTION SIGNAL PRE-START CIRCUIT FOR A CONSTANT SPEED, STROKE-WRITE VECTOR DISPLAY SYSTEM

[75] Inventor: Charles William Sweeting, Norwalk, Conn.

[73] Assignee: United Technologies Corporation, Hartford, Conn.

[22] Filed: Jan. 7, 1976

[21] Appl. No.: 647,230

[52] U.S. Cl. .......................... 340/324 A; 315/367; 315/371; 315/384

[51] Int. Cl.$^2$ .......................... G06K 15/20

[58] Field of Search ............... 340/324 A, 324 AD; 315/367, 371, 380, 386

[56] References Cited

UNITED STATES PATENTS

| | | | |
|---|---|---|---|
| 2,678,964 | 5/1954 | Loughlin | 315/386 X |
| 3,396,306 | 8/1968 | Mallebrein | 315/367 |
| 3,582,705 | 6/1971 | Waller et al. | 315/367 |
| 3,746,912 | 7/1973 | Redecker et al. | 340/324 A |
| 3,787,834 | 1/1974 | Elliott | 340/324 M |
| 3,809,868 | 5/1974 | Villalobos et al. | 340/324 A |
| 3,889,244 | 6/1975 | Sinobad | 340/324 A |
| 3,962,604 | 6/1976 | Guenard et al. | 340/324 A |

*Primary Examiner*—David L. Trafton
*Attorney, Agent, or Firm*—Dominic J. Chiantera

[57] ABSTRACT

In a constant speed stroke-write vector display system having a video gate signal for initiating the video display of a stroke vector at a time coincident with the start of the horizontal and vertical deflection signals, the deflection signals starting value for each displayed vector is offset by an amount which is proportional to, but of opposite polarity with, the rate magnitude of the respective deflection signal, and the video gate signal is delayed for a time interval following the start of the deflection signals, the amount of time delay being substantially equal to the product of either deflection signal offset amount and the reciprocal of the respective deflection signal rate magnitude.

7 Claims, 4 Drawing Figures

DEFLECTION SIGNAL PRE-START CIRCUIT FOR A CONSTANT SPEED, STROKE-WRITE VECTOR DISPLAY SYSTEM

BACKGROUND OF THE INVENTION

1. Field of Invention

This invention relates to constant speed stroke-write vector display systems, and more particularly to a stroke-writer system having horizontal and vertical deflection signal pre-starts to eliminate displayed stroke vector distortion due to deflection signal noise.

2. Description of the Prior Art

As may be known, the stroke-write method of displaying information on a cathode ray tube (CRT) include the use of a series of stroke vectors connected by interim wait periods to generate a video data display, such as mapping data or alpha-numeric characater generation. Such systems operate at high writing speeds, requiring rapid changes in the horizontal and vertical deflection signals to permit the required rapid change in vector magnitude and deflection angle (directional displacement). At the beginning of each stroke vector display time, the deflection signals are maintained at a constant value to hold the CRT electron beam stationary for a "waiting" period, to permit the electron beam to settle. The deflection signals for the displayed stroke vector are then generated at a rate magnitude which is a function of the stroke vector deflection angle, corresponding to the desired directional displacement of the new vector. The rapid start up of the deflection signals at relatively high switching frequencies causes "ringing" noise at the initialization of the deflection sweep voltages, resulting in a characteristic "hook distortion" on the leading edge of the displayed stroke vector. Such distortion is undesirable since it results in a loss in fidelity of the displayed data.

Due to the wide variation in stroke vector magnitudes and deflection angles, from 0° to 360°, elimination of the displayed vector distortion by use of prior art methods of: (1) providing a fixed threshold voltage above the deflection signal noise level on both the horizontal and vertical deflection channels which requires both deflection signals to exceed the threshold before video display of the stroke vector is permitted, or (2) delaying the video display for a fixed time interval following the start of the deflation signals, are impractical. In (1)the variations in the magnitude of the non-displayed portion of the stroke vector resulting from the wide variation in vector deflection angles creates substantial errors in the displayed magnitude of the stroke vector, and in (2) there is a failure to display the full stroke vector magnitude.

SUMMARY OF THE INVENTION

An object of the present invention is to provide an improved constant speed stroke-write vector display system which eliminates the display of the initial distorted portion of all displayed stroke vectors at all deflection angles, while maintaining full display of the stroke vector magnitude within the defined vector coordinate values.

According to the present invention, in a constant speed stroke-write vector display system having a video gate signal for enabling the video display at a time coincident with the start of the horizontal and vertical deflection signals, the deflection signal start values for each displayed stroke vector are defined, together with the stop values and deflection signal rate of change, by a vector generator which provides a pair of vector starting position signals and a pair of vector ending position signals which together define the respective start position and end position of the orthogonal components of the stroke vector in each of two orthogonal coordinates, and a rate magnitude signal for each of the orthogonal components, and the deflection signal start values are offset by an amount which is proportional to, but of opposite polarity with, the rate magnitude of the respective deflection signal, and the video gate signal is delayed for a time interval following the start of the deflection signals, the amount of time delay being substantially equal to the product of either deflection signal offset amount and the reciprocal of the respective deflection signal rate magnitude. In further accord with the present invention, the time interval of the delayed video gate signal, and the amount of starting value offset are proportional to the time duration of the distorted portion of the stroke vector.

The improved stroke-write vector display system of the present invention provides pre-starting of the deflection signals and time delay of the video display for a fixed time interval to eliminate displayed distortion of the intial portion of a stroke vector at any deflection angle, while maintaining full magnitude display of the vector within the defined vector coordinate values. The non-display of the leading edge of the stroke vector also permits reduction of the deflection circuitry bandwidth with a subsequent reduction in system cost. In addition, the added system cost and complexity required by the present invention is minimal, allowing the additional circuitry required by the invention to be easily incorporated into prior art systems.

Other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 4:
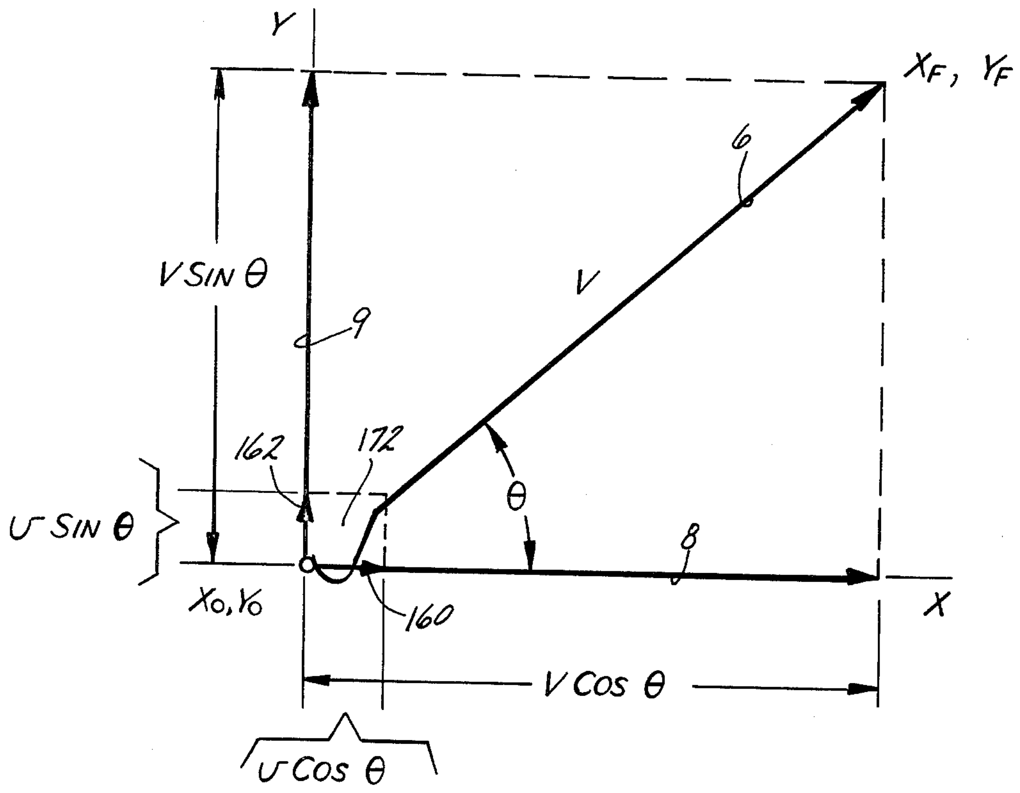
FIG. 4 is an illustration of the orthogonal components of a stroke vector used in describing the operation of the embodiment of FIG. 1.

Referring first to FIG. 4, in general, the magnitude (V) and deflection angle $\theta$ of a stroke vector 6 in a stroke-write vector display system are defined by signal information defining the orthogonal components of the stroke vector, in X and Y, provided by a vector data generator. These components are defined, through known trigonometric identities, by their magnitudes $X = V \cos \theta$, 8, and $Y = V \sin \theta$, , 9, and their end point coordinates $X_O$, $X_f$, and $Y_0$, $Y_f$. In a constant speed stroke-write display system, the horizontal and vertical deflection circuits provide deflection signals having a rate magnitude proportional to the stroke vector deflection angle $\theta$, which is provided to the deflection circuits by rate magnitude signals A cos $\theta$ and A sin $\theta$, describing the deflection angle value in each of the two orthogonal components of the stroke vector, where A is a scaling constant value.

Figure 1:
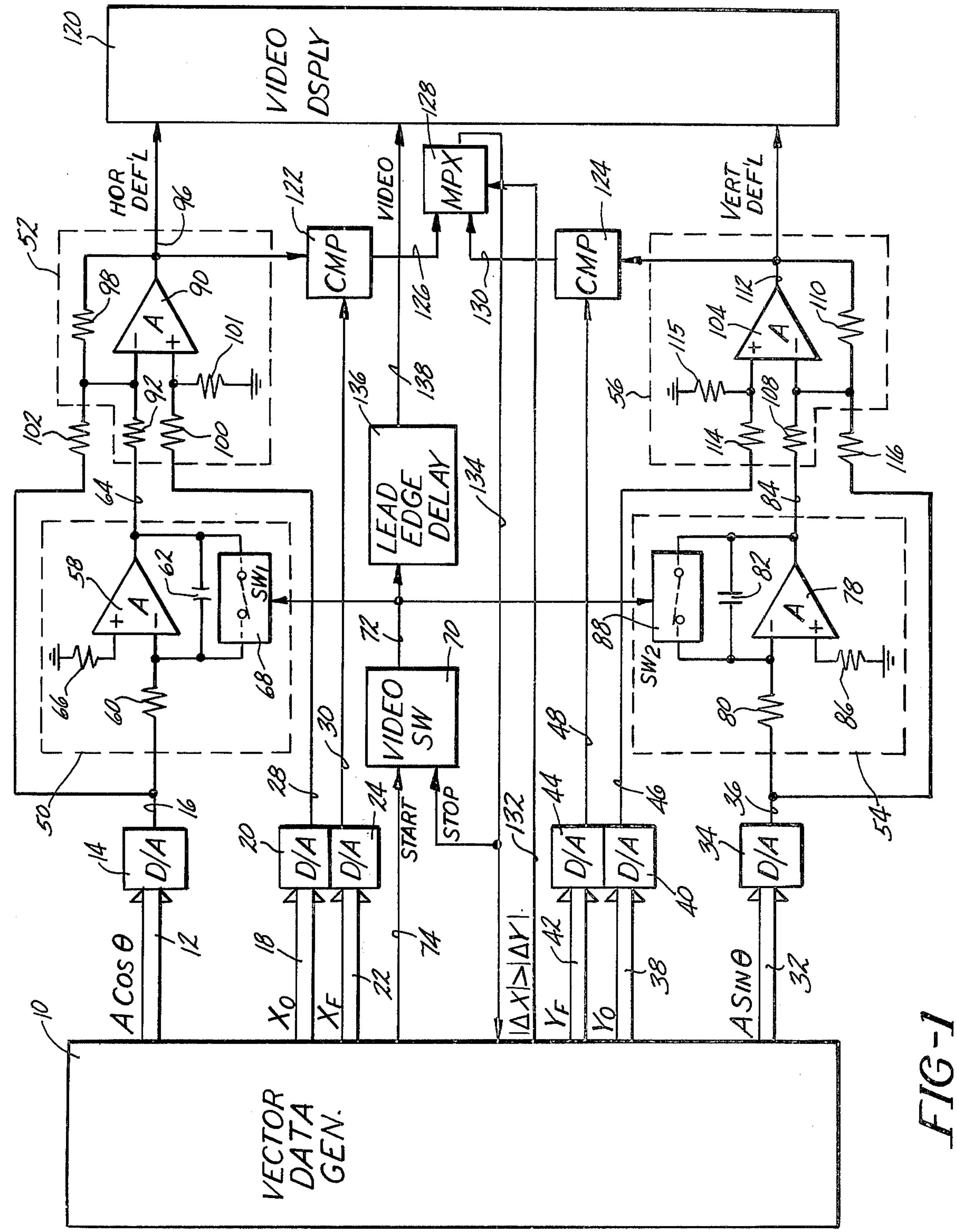
FIG. 1 is a schematic diagram of an improved stroke-write vector display system according to the present invention.

Referring now to FIG. 1, in a constant speed stroke-write vector display system according to the present invention, the rate magnitude of the X component for each stroke vector is provided by a vector data generator 10, which provides a digital signal representative of the magnitude A cos $\theta$ through a set of lines 12 to a digital-to-analog converter (D/A) 14. The D/A 14 converts the digital signal into an equivalent analog signal representative of the X component rate magnitude on a line 16. The generator 10 provides digital signals representative of the X component start and end coordinates $X_O$, $X_f$, a digital signal representative of the start point coordinates ($X_O$) being provided through a set of lines 18 to a D/A 20, and a digital signal representative of the end point coordinates ($X_f$) being provided through a set of lines 22 to a D/A 24. The D/A 20 provides an analog signal equivalent of $X_O$ on a line 28, while the D/A 24 provides an analog signal equivalent of $X_f$ on a line 30. Similarly, the generator 10 provides the Y component rate magnitude by a digital signal representative of the magnitude A sin $\theta$ on a set of lines 32 to a D/A 34, which provides the analog signal equivalent of the Y component rate magnitude on a line 36. The Y end point coordinates $Y_O$, $Y_f$, are also provided by the generator by digital signals representative of the start point coordinates ($Y_O$) through a set of lines 38 to a D/A 40, and the end point coordinate ($Y_f$) through a set of lines 42 to a D/A 44. The D/A's 42, 44 provide analog signal equivalents of $Y_O$ and $Y_f$ respectively, on the lines 46, 48. Although the vector signal information provided by the vector generator in FIG. 1 is in a digital signal format to facilitate system speed and accuracy, as may be appreciated, the signal information could likewise be provided in an analog signal format when required.

The X and Y component rate magnitudes are presented to the horizontal and vertical deflection circuitry, which includes a horizontal deflection integrator 50 and summing circuit 52, and a vertical deflection integrator 54 and summing circuit 56. The integrator and summing circuit of the horizontal deflection circuitry being identical to that of the vertical deflection circuitry. The integrator 50 includes an active amplifier such as an operational amplifier 58, whose inverting node is connected through a resistor 60 to the line 16, and connected through a capacitor 62 to the output of the amplifier on a line 64. The amplifier 58 non-inverting node is connected through a resistor 66 to ground. The capacitor 62 is shunted by a switch $SW_1$ 68, connected in parallel across the capacitor and selectably operable in response to a video gate signal from a gated video switch circuit 70 provided on a line 72. The video switch circuit 70 provided the video gate signal in response to a START signal provided by the vector generator 10 on a line 74. The switch $SW_1$ is disabled in the absence of a video gate signal on the line 72 during which the contacts are closed, as shown in FIG. 1, shorting out the capacitor 62 and inhibiting integrator operation. When $SW_1$ 68 is enabled by the presence of a video gate signal, the switch contacts are caused to open and remove the short across the capacitor 62, permitting integration of the A cos $\theta$ rate magnitude signal on the line 16. The integral gain is equal to $K_I = 1/(R_{60} \cdot C_{62})$, the integrated signal appearing on the line 64 in the form $K_I \cdot t \cdot$ (A cos $\theta$), where $t$ represents time. The integrator 54 is identical to the integrator 50 and includes an operational amplifier 78 with an inverting node connected through a resistor 80 (equal in value to the resistor 60) to the line 36, and connected to a capacitor 82 (equal in value to the capacitor 62) to the output of the amplifier on a line 84. The non-inverting input is connected through a resitor 86 to ground. The capacitor 82 is shunted by a switch $SW_2$ 88, identical to the switch $SW_1$, and similarly, selectably operable by the video gate signal on the line 72, and when enabled, permits integration of the rate magnitude signal A sin $\theta$ on the line 36, the integral gain being equal to that of the integrator 50, and the integrated signal appearing on the line 84 having the form $K_I \cdot t \cdot$(A sin $\theta$).

In the summing circuit 52, of the horizontal deflection circuitry, an operational amplifier 90 receives at its inverting node the integrator signal on the line 64 presented through a resistor 92, and the output signal of the amplifier 90 on a line 96 presented through a resistor 98. The amplifier 90 non-inverting node is connected through a resistor 100 to the starting coordinate signal $X_O$ on the line 28, and connected through a resistor 101 to ground. In addition, the rate magnitude signal A cos $\theta$ on the line 16 is presented to the inverting node of the amplifier 90, through a resistor 102. Similarly, the summing circuit 56 includes an operational amplifier 104 whose inverting node is connected through a resistor 108 to the integrator output signal on the line 84, and through a resistor 110 to the output of the amplifier 104 on a line 112. The amplifier non-inverting input is connected through a resistor 114 to the starting coordinate signal $Y_O$ on the line 46, and through a resistor 115 to ground. The amplifier 104 additionally receives at its inverting node the rate magnitude signal A sin $\theta$ on the line 36, presented through a resistor 116. The resistor values of the summing circuit 56 are equal to the like function resistors in the summing circuit 52.

The integrator 50 and summing circuit 52 provide for each horizontal deflection signal sweep period, a horizontal deflection voltage on the line 96 whose initial value, prior to the enabling of $SW_1$ 68, corresponds to value of the start position coordinate signal of the X component on the line 28, and which following the enabling of $SW_1$ 68 by a line 72 gate signal, changes with time in a ramp like fashion in dependence upon the rate magnitude of the X component, according to the expression $K_I \cdot t \cdot$A cos $\theta$ (volts per second). In a similar manner, the voltage signal appearing on the line 112 prior to the enabling of $SW_2$ 88 corresponds to the value of the start position coordinate signal of the Y component on the line 46 and following $SW_2$ enablement changes with time in a ramp like manner at a rate defined by the expression $K_I \cdot t \cdot$A sin $\theta$, the voltage signal being representative of the vertical deflection signal.

The horizontal deflection signal on the line 96 is presented to a horizontal deflection signal input of a video display apparatus 120, which includes a CRT, and to one input of a comparator 122, which receives at a second input the end coordinate signal $X_f$ on the line 30. The vertical deflection signal on the line 112 is presented to a vertical deflection signal output of the video display 120. The voltage signal on the line 112 is also presented to one input of a comparator 124 which receives at a second input the end point coordinate signal $Y_f$ on the line 48. The combination of the horizontal and vertical deflection signals provide deflection of the displayed stroke vector at a given deflection angle and rate magnitude, beginning at a pair of vector starting position coordinates defined by the respective horizontal and vertical start values, and ending at a pair of vector ending position coordinates defined by the respective horizontal and vertical stop values. The comparators 122, 124 compare the actual value of the horizontal and vertical deflection signals, to the desired end point coordinate signals ($X_f$, $Y_f$) provided by the vector generator 10. When the voltage value of the signal on the line 96 is equal to the desired end point coordinate voltage signal ($X_f$) on the line 30, the comparator 122 provides a signal indication through a line 126 to a multiplexer 128, representative of the condition $\Delta X = O$ ($\Delta X = X_f - X_O$). Similarly, the comparator 124 provides an identical signal indication through a line 130 to a second input of the multiplexer 128, whenever the voltage signal on the line 112 is equal to the voltage magnitude of the end point coordinate signal ($Y_f$) on the line 48, indicating the condition $\Delta Y = O$ ($\Delta Y = Y_f - Y_O$).

Ideally, the deflection signal time periods of the horizontal and vertical signals are equal, such that the conditions $\Delta X = O$ and $\Delta Y = 0$ occur at the same time. In fact, however, the offsets and component tolerances associated with each deflection signal integrator, cause unequal time periods. Since the larger of the two component vector magnitudes is less effected by integrator offset errors, it is selected as the indication of the end point coordinate of the stroke vector. Therefore, the multiplexer 128 selects one of the two signal lines 126, 130 in dependence on a select gate signal presented by the vector generator 10 on a line 132, which provides signal information indicative of the greater of the X and Y component absolute magnitudes, such that the presence of a select gate signal is an indication of $|\Delta X|$ greater than $|\Delta Y|$, and in response thereto, the multiplexer 128 selects the $\Delta X = O$ signal on the line 126. In the absence of such a gate signal indication, the multiplexer 128 selects the $\Delta Y = O$ signal on the line 130. The multiplexer 128 provides the selected one of the signals from the lines 126, 130 to an output line 134 which is presented to a STOP input of the video switch 70, which in response thereto, removes the video gate signal on the line 72.

The video switch 70 provides, in response to a start gate signal on the line 74 provided by the vector generator 10, an output video gate signal through a line 72 to a leading edge delay circuit 136 of a type well known in the art, such as the Raytheon RG-80 leading edge delay, which provides a predetermined time delay to only the leading edge of the line 72 video gate signal. The delay circuit 136 presents the delayed leading edge video gate signal through a line 138 to a video input of the video display 120. As stated hereinbefore, the leading edge delay 136 is of a type well known in the art and the actual embodiment of the delay, whether as an integrated circuit or a hybrid configuration, is dependent on the accuracy requirements and operating environment of the display system.

In the operation of the system during each deflection signal cycle, the component rate magnitudes($A \cos \theta$ and $A \sin \theta$) are presented on the line 16, 36 and simultaneous start and end point coordinate data is provided for $X_O$ and $X_f$ on the lines 28, 30, and $Y_O$ and $Y_f$ on the lines 46, 48. After settling of the data on the lines, a START gate signal is provided by the vector generator 10 on the line 74 to the video switch 70 which simultaneously provides a video gate signal on the line 72 which enables the integrators 50, 54. The integrators 50, 54 provides integral signals $K_I \cdot t \cdot (A \cos \theta)$, $K_I \cdot t \cdot (A \sin \theta)$ on the lines 64, 84 to the summing circuits 52, 56. The start point coordinates $X_o$, $Y_o$ are simultaneously presented through the lines 28, 46 to another input of the summing circuits 52, 56. The voltage gain for the integrator signal on the line 64 and the position signal on the line 28 are typically equal to each other, and are identical in each of the summing circuits. The gain for both signals are equal to K.

Figure 2:
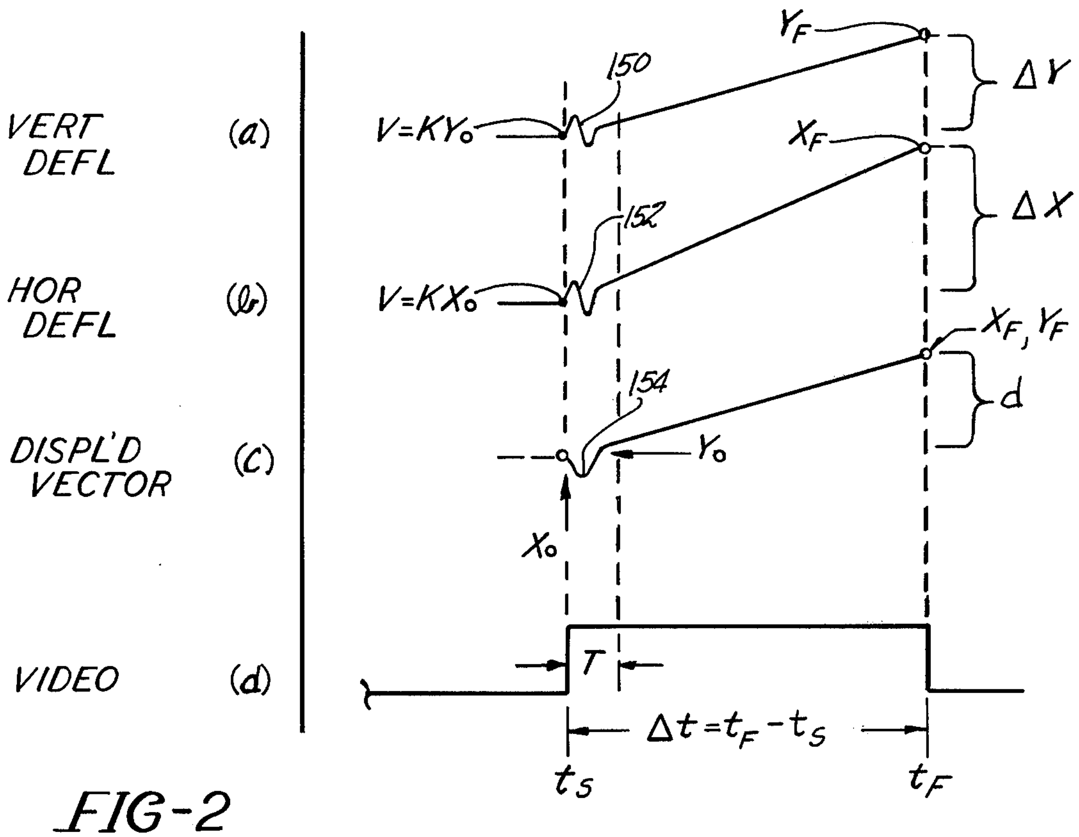
FIG. 2 is an illustration of the functional characteristics of a portion of the embodiment of FIG. 1.

If the component rate magnitude signals are not provided to the summing circuits, the summing circuits provide, in response to the integrator and start position signals, voltage signals on the lines 96, 112 similar to those shown in FIG. 2, illustration (a) and (b). As shown in FIG. 2, illustration (a), the voltage waveform at the output of the vertical summing circuit has an initial voltage value at time $t_s$ which is proportional to the start point coordinate $Y_O$, and the horizontal deflection signal from the horizontal summing circuitry (illustration (b)) has a voltage value proportional to the start point coordinate $X_O$. At $t_s$ the video gate signal on the line 72 (illustration (d)) enables the vertical and horizontal integrators, which provide integration of the component rate magnitude signals, causing an initial noise switching transient to appear on the lead portion of each deflection signal, as shown by the noise signal 150 on the vertical deflection signal and 152 on the horizontal deflection signal, after which, both deflection signals integrate at a rate dependent upon the rate magnitude of the components to the respective stop values proportional to the end point coordinate signals $Y_f$, $X_f$ respectively. If the video gate signal is simultaneously applied to the video display 120 at time $t_s$, the resultant displayed stroke vector (illustration (c)) exhibits a characteristic "hook" distortion, as shown at 154 in illustration (c), after which the stroke vector is displayed for the duration of the video gate signal time period $\Delta t$.

In the FIG. 1 embodiment of the stroke-write display system of the present invention, the X, Y component vector magnitude on the lines 16, 36 are also presented to the summing circuits 52, 56, and are summed with the X and Y start point coordinate signals to provide a new start point value for each deflection signal. The new start point value is provided by offsetting each of the start point coordinate signals ($X_O$, $Y_O$) by a coordinate amount whose value is derived from the time duration of the deflection signal switching noise, which is constant for a given system writing speed, and from the deflection angle of the displayed stroke vector which in turn defines the rate magnitude of the X and Y components as described hereinbefore. The amount of offset required for each stroke vector is determined in the following manner. In FIG. 2, the duration of the signal distortion is shown as being equal to T. The horizontal and vertical deflection signals defined as a function of time (ignoring the starting coordinate signals) are equal to $K_I \cdot t \cdot (A \cos \theta)$ and $K_I \cdot t (A \sin \theta)$ respectively. The magnitude of the stroke vector as a function of time is defined as:

$$V = \sqrt{[K_I t (A \cos \theta)]^2 + [K_I t (A \sin \theta)]^2} = K_I t \cdot A$$

and the rate magnitude ($dV/dt$) or writing speed of the stroke vector is equal to $K_I A$, and is constant.

The time duration of the signal noise being equal to T, the magnitude of the stroke vector at the end of the distortion interval is $|v| = K_I \cdot T \cdot A = |V|$. The magnitude of the stroke vector components in X and Y at time T are equal to $V_x = K_I \cdot T \cdot A \cos\theta$ and $V_y = K_I \cdot T \cdot A \sin\theta$ respectively. The magnitude of V in each of the orthogonal components is proportional to the respective rate magnitudes by the factor $K_I \cdot T = K_o$. Since the time duration T of the stroke vector distortion is known, and constant for a given system bandwidth, and the integral gain $K_I$ is constant for a constant write system, the factor $K_o$ is likewise constant. Therefore, the values of $V_x$ and $v_y$ are equal to $K_o \cdot A \cos\theta$ and $K_o \cdot A \sin\theta$, and are directly proportional to the rate magnitude of the vector components, and in turn proportional to the stroke vector deflection angle.

Referring again to FIG. 1, the rate magnitude A cos $\theta$ on the line 16 is presented to the summing circuit 52 through the resistor 102, at a gain defined by the ratio of $R_{98}R_{102}$. If the gain for the start point coordinate signal $X_O$ on the line 28, and the integrator signal on the line 64, is equal to unity through the summing circuit, the gain for the A cos $\theta$ rate magnitude is equal to $K_o = R_{98}/R_{102}$. The expression for the voltage signal appearing on the line 96 is equal to $(X_O - _{Ko} \cdot A \cos\theta) + K_I \cdot t \cdot A \cos\theta$, and the horizontal deflection signal start value is offset by the quantity $K_o \cdot A \cos\theta$. The summing circuit 56 is identical to that of the circuit 52, the expression for the voltage signal on the line 112 is equal to $(Y_O - \lambda_{Ko} \cdot A \sin\theta) + K_I t A \sin\theta$, the vertical deflection signal start value being offset by the quantity $K_o \cdot A \sin\theta$.

Figure 3:
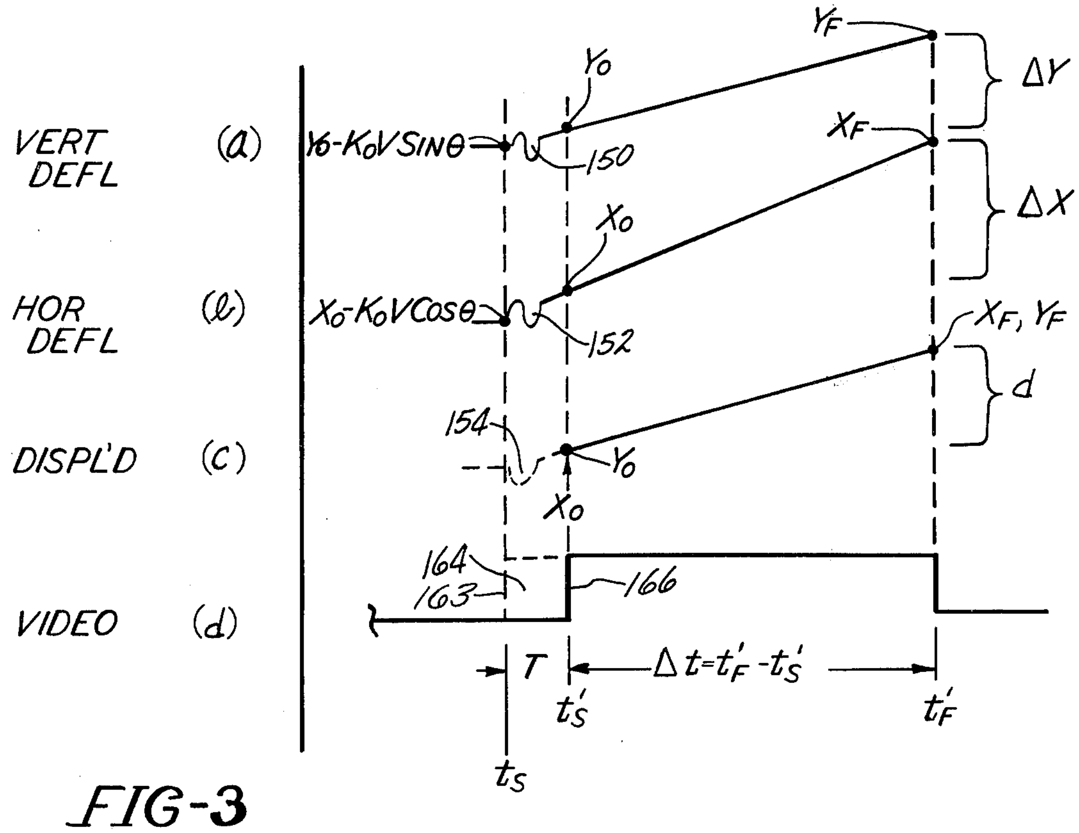
FIG. 3 is an illustration of the functional characteristics of another portion of the embodiment of FIG. 1.

Referring to FIG. 3, the effect of offsetting the vertical and horizontal deflection signal start values is shown in illustrations (a) and (b). At the appearance of the video gate signal (163 of illustration (d)) on the line 72 (FIG. 1) at time $t_s$, the deflection signals begin integrating from the coordinate start points $Y_O - _{Ko}$ A sin $\theta$ and $X_O - _{Ko}$ A cos $\theta$, while the video gate signal on the line 138 (FIG. 1) is delayed by a time delay T (164, illustration (d)). The noise transients which appear on the deflection signal slopes (150, 152, illustrations (a) and (b)) cause the "hook" distortion of the leading portion of the stroke vector (154, illustration (c)), however, the distortion occurs during the non-presence of the video gate signal on the line 138 (FIG. 1) and the distorted vector portion is blanked from the screen of the CRT. At the completion of the delay period T, the delayed video gate signal (166, illustration (d)) appears on the line 138 providing illumination of the stroke vector on the CRT screen beginning at the start coordinate values $X_O$, $Y_O$. The stroke vector is displayed for the duration of the deflection signal periods as determined by the detection of the deflection signal stop values by the comparators 122, 124 (FIG. 1) as described hereinbefore. The time duration $\Delta t$ of the displayed vector is equal to that of the displayed vector of FIG. 2, illustration (d) as shown.

As stated hereinbefore, the time duration T of the noise signal is substantially constant for any given stroke-write system, the value being dependent upon the switching frequency and bandwidth of the system, and may vary from ten nanoseconds to one microsecond, with a typical time duration of 250 nanoseconds. Since the time duration T of the deflection signal prestart is added to the interim "wait" interval between displayed stroke vectors, there is an increase in the time required to display each stroke vector, and the time required to write a full screen of data is increased proportionally. However, the time required for the pre-start interval is a relatively small percentage of the present rate periods between stroke vectors since the interim "wait" period is typically equal to two microseconds, and the pre-start time interval of the present invention results in a typical 10 to 15 percent increase in this time.

The stroke-write vector display system of the present invention prevents the display of the distorted portion of the stroke vector, therefore, providing a significant increase in display fidelity and resolution. In addition, the use of the deflection signal pre-start considerably reduces the deflection circuit bandwidth requirements, which in prior art systems, must be wide enough to permit a deflection circuit response time fast enough to reproduce the leading edge of the stroke vector, whereas in the present system the leading edge of the stoke vector occurs during the pre-start interval in which video is not displayed. In addition, the pre-start feature described hereinbefore may be incorporated into prior art systems with a minimum amount of system redesign, requiring essentially only the addition of scaling resistors to each of the summing circuits to provide the required gain amplification of the X, Y rate magnitudes, and their summation with the respective start position coordinate signals to provide the offset in deflection signal starting values, in addition to the added leading edge delay circuit in the video gate drive. The pre-start feature provides a constant time value pre-start for stroke vectors having any deflection angle (all directions in all quadrants) and does not affect the system writing accuracy. Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described a typical embodiment of my invention, that which I claim as new and desire to secure by Letters Patent is:

1. An improved constant speed stroke-write vector display system, of the type which includes, a CRT video display, vector generator means for providing, a pair of start position signals and a pair of end position signals that together define the start position and end position of a vector in each of two orthogonal coordinates, a pair of rate magnitude signals which are proportional to the orthogonal components of the stroke vector deflection angle in each of the orthogonal coordinates, and a video start signal, deflection means responsive to the vector generator, for providing deflection signals in each of the two orthogonal coordinates, each signal having an amplitude rate of change with time in dependence on a respective one of the rate magnitude signals, and each signal having a start value and a stop value in dependence on the respective start positon and end position coordinate signals in each of the two orthogonal coordinates, a video means responsive to the vector generator and to the deflection circuits for providing a video gate signal beginning in response to the video start signal and ending in response to each of the deflection signals attaining a magnitude corresponding to the vector end position signals, the improvement comprising:

delay means responsive to the gated video switch for delaying the video gate signal for a determined time interval and for applying the resulting delayed video signal to the CRT display; and deflection offset means responsive to the vector generator for providing a pair of deflection offset signals, each corresponding to the start value of the deflection signals in a different one of the two orthogonal coordinates, and each having a magnitude which is proportional to and of a polarity opposite to the rate magnitude signal in a respective one of the orthogonal coordinates, said offset means summing each of the deflection offset signals to a related one of the deflection signals and providing the summed deflection signals to the CRT display.

2. The improved system according to claim 1, wherein the relationship of the magnitude of both of the offset signals to the rate magnitude signal in a respective one of the orthogonal coordinates is the same and is such as to provide offset deflections having a time interval equal to the determined time interval of said delay means.

3. The improved system according to claim 1, wherein the magnitude of each of the pair of deflection offset signals is equal to the product of the respective deflection signal amplitude rate of change and the determined time interval of said delay means.

4. In a display system of the type which includes, CRT video display, vector generator means for providng a pair of orthogonal coordinate deflection magnitude signals, a pair of vector start position signals and a pair of vector end position signals that together define the start and end of a vector in each of two orthogonal coordinates, and a video start signal, deflection means responsive to said vector generator means for providing deflection signals in each of two orthogonal coordinates in response, respectively, to respective ones of said coordinate magnitude signals and vector position signals, video means responsive to said vector generator means and to said deflection means to provide a video signal beginning in response to said video start signal and ending in response to each of said deflection signals attaining a magnitude corresponding to said vector ending signals, the improvement comprising:

delay means responsive to said video means for delaying said video signal for a determined time interval; and deflection offset means responsive to said vector generator for providing a pair of deflection offset signals, each corresponding to one of said coordinates and each of a magnitude related to a respective one of said deflection magnitude signals and of a polarity opposite to the respective one of said deflection signals, each of said offset signals being summed to the related one of said deflection signals.

5. An improved method for displaying constant speed stroke-write vectors, of the type which includes the steps of, providing, a pair of start position signals and a pair of end position signals that together define the start position and end position of a vector in each of two orthogonal coordinates, a pair of rate magnitude signals which are proportional to the orthogonal components of the stroke vector deflection angle in each of the orthogonal coordinates, and a video start signal, providing deflection signals in each of the two orthogonal coordinates in response to the signal information, each signal having an amplitude rate of change with time in dependence on a respective one of the rate magnitude signals, and each signal having a start value and a stop value in dependence on the respective start position and end position coordinate signals in each of the two orthogonal coordinates, providing a video gate signal beginning in response to the video start signal and ending in response to each of the deflection signals attaining a magnitude corresponding to the vector end position signals, the improvement comprising:

delaying the video gate signal for a determined time interval and applying the resulting delayed video signal to the CRT display;

providing a pair of deflection offset signals, each corresponding to the start value of the deflection signals in a different one of the two orthogonal coordinates, and each having a magnitude which is proportional to and of a polarity opposite to the rate magnitude signal in a respective one of the orthogonal coordinates;

summing each of the deflection offset signals to a related one of the deflection signals; and presenting the summed deflection signals to a CRT video display.

6. The improved method according to claim 5, wherein the relationship of the magnitude of both of the offset signals to the rate magnitude signal of a respective one of the orthogonal coordinates is the same and is such as to provide offset deflections having a time interval equal to the determined time interval of the delayed video gate signal.

7. The improved method according to claim 5, wherein the magnitude of each of the pair of deflection offset signals is equal to the product of the respective deflection signal amplitude rate of change and the determined time interval of the delayed video gate signal.

* * * * *

UNITED STATES PATENT OFFICE
CERTIFICATE OF CORRECTION

PATENT NO. : 4,001,806
DATED : January 4, 1977
INVENTOR(S) : Charles W. Sweeting It is certified that error appears in the above-identified patent and that said Letters Patent are hereby corrected as shown below:

Column 1, line 10, "writer" should read --write--

Column 1, line 18, "characater" should read --character--

Column 7, line 1, "$K_I \cdot T \cdot {}^{A}$" should read --$K_I \cdot T \cdot A$--

Column 7, line 3, "$V_x = K_I \cdot T \cdot {}^{A}$" should read --$v_x = K_I \cdot T \cdot A$--

Column 7, line 3, "$V_y = K_I \cdot {}^{T \cdot A}$" should read --$v_y = K_I \cdot T \cdot A$--

Column 7, line 11, "$V_x$" should read --$v_x$--

Column 7, line 18, "$R_{98}R_{102}$" should read --$R_{98}/R_{102}$--

Column 7, line 23, "$X_o -_{Ko} \cdot A$" should read --$X_0 - K_o \cdot A$--

Column 7, line 27, cancel "λ" and insert --$K_o$--

Column 7, line 28, cancel "$K_o$"

Column 7, line 28, "$K_I \cdot tA$" should read --$K_I \cdot t \cdot A$--

Column 7, line 35, "$Y_o -_{Ko}$" should read --$Y_0 - K_o$--

UNITED STATES PATENT OFFICE

CERTIFICATE OF CORRECTION

Patent No. 4,001,806 Dated January 4, 1977

Inventor(s) Charles W. Sweeting

It is certified that error appears in the above-identified patent and that said Letters Patent are hereby corrected as shown below:

Column 7, line 36, "$X_o$-$K_o$" should read -- $X_0$-$K_o$ --.

Signed and Sealed this

*Sixth* Day of *September 1977*

[SEAL]

*Attest:*

RUTH C. MASON
*Attesting Officer*

LUTRELLE F. PARKER
*Acting Commissioner of Patents and Trademarks*